United States Patent [19]

Pistole et al.

[11] 4,278,490
[45] Jul. 14, 1981

[54] SLEEVE FOR CHANGING DIAMETER OF COLLAPSIBLE MANDREL

[75] Inventors: Robert G. Pistole; Walter A. Stoll, both of Toledo, Ohio; Leo A. Oswald, Huntingdon, Pa.

[73] Assignee: Owens-Corning Fiberglas Corporation, Toledo, Ohio

[21] Appl. No.: 106,135

[22] Filed: Dec. 21, 1979

[51] Int. Cl.³ .................. B65H 81/00; B29C 1/00
[52] U.S. Cl. .................. 156/425; 156/417; 249/179; 425/440
[58] Field of Search ............ 156/425, 428, 429, 414, 156/417; 249/178, 179, 180, 181, 182; 242/115, 72 R, 110.1, 110.2, 7.22; 425/DIG. 14, 468, 403, 440, 441, 442, 436 RM; 268/48.1

[56] References Cited

U.S. PATENT DOCUMENTS

| 3,583,200 | 6/1971 | Cvijanovic | 425/DIG. 14 |
| 4,128,450 | 12/1978 | Cantarutti | 156/417 |

Primary Examiner—Michael W. Ball
Attorney, Agent, or Firm—Ronald C. Hudgens; Kenneth H. Wetmore; Paul J. Rose

[57] ABSTRACT

A collapsible mandrel having a longitudinally slit tubular shell providing a molding surface for glass fiber reinforced plastic pipe is provided with a removably mountable longitudinally slit sleeve as a molding surface for pipe of larger diameter.

3 Claims, 4 Drawing Figures

SLEEVE FOR CHANGING DIAMETER OF COLLAPSIBLE MANDREL

TECHNICAL FIELD

This invention relates generally to glass fiber reinforced resin tank bodies or pipe, and more particularly to a means for changing the diameter of a collapsible mandrel for making tank bodies or pipe.

BACKGROUND ART

Tank bodies and pipe have been made of glass fiber reinforced thermosetting resin by both continuous and non-continuous processes. In a continuous process, resin and glass fibers are applied to a rotating and advancing cylindrical surface formed by a continuously recirculating helically wound steel band. In a non-continuous process, resin and glass fibers are applied to an elongated longitudinally slit collapsible tubular shell rotatable about a horizontal axis and supported from only one end, leaving the other end free for withdrawal of the product after the resin is cured. For different sizes of pipe interchangeable slit tubular shells of different diameters have been used with the same driving and support mechanism, each tubular shell having its own extensive inner supporting framework and set of actuators for collapsing thereof.

DISCLOSURE OF INVENTION

When two not greatly differing sizes of tank bodies or pipe are desired, instead of providing two tubular shells each with its own complete supporting framework and set of actuators for collapsing thereof, in accordance with the invention, only the smaller complete shell or mandrel is provided, and a sleeve is bolted thereon to convert the smaller mandrel to a larger one.

BEST MODE OF CARRYING OUT THE INVENTION

Figure 1:
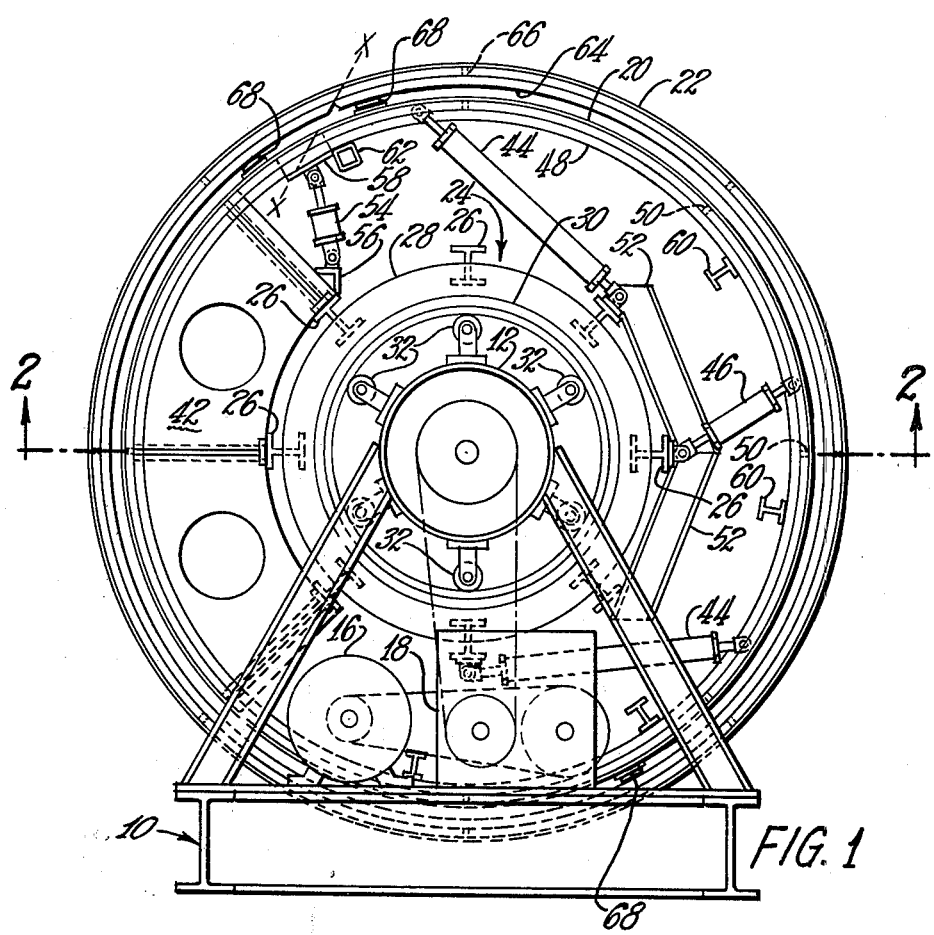
FIG. 1 is an end elevational view of a collapsible mandrel having a sleeve mounted thereon in accordance with the invention, and supporting and driving means therefor.
Figure 2:
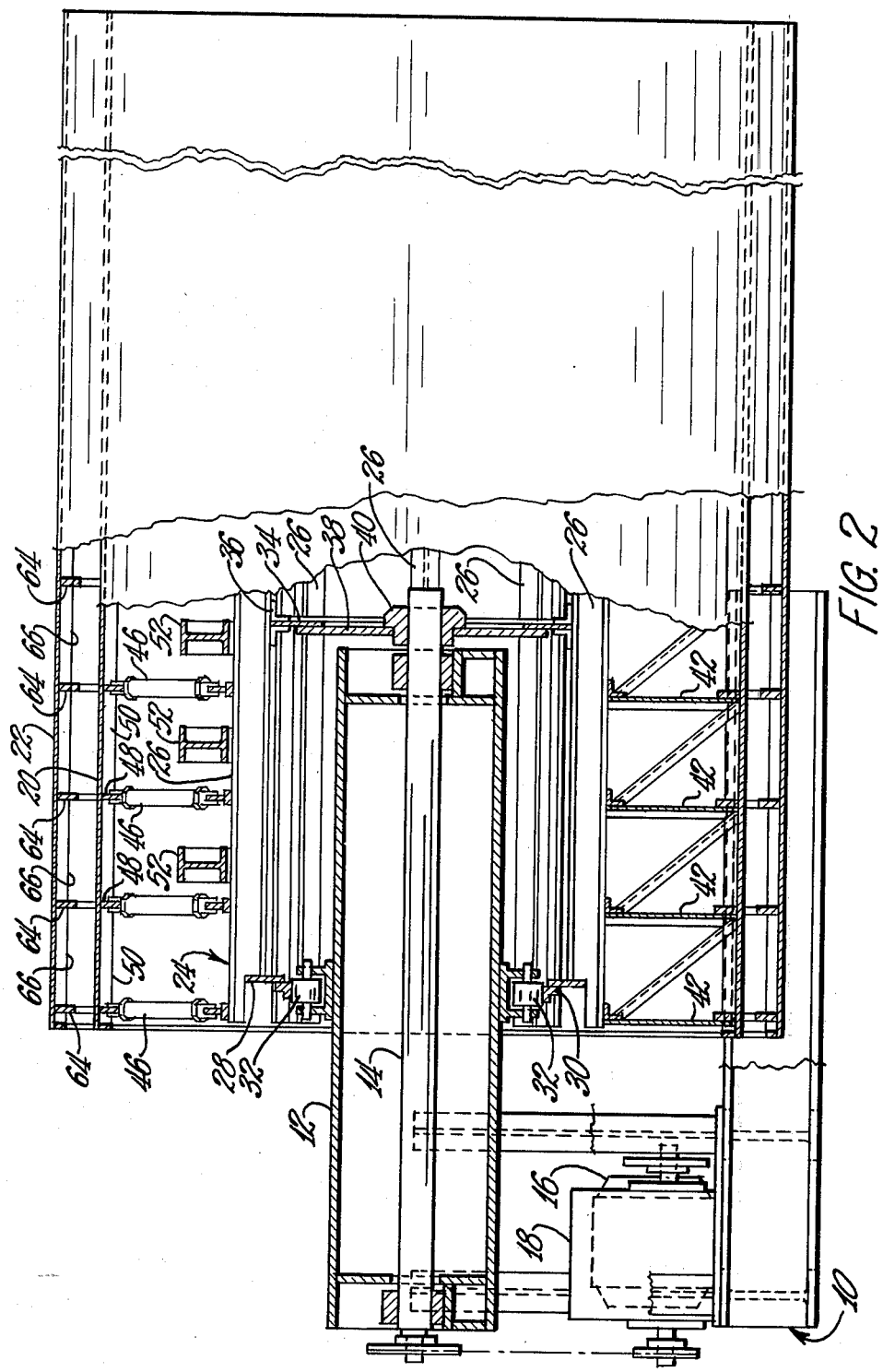
FIG. 2 is a fragmentary side elevational view of the apparatus of FIG. 1, partly in section, the sectional part of the mandrel and sleeve being taken substantially along the line 2—2 of FIG. 1.

With respect to the drawings, FIGS. 1 and 2 show a suitable I-beam framework 10 for rigidly supporting a stationary sleeve 12 having a mandrel driveshaft 14 suitably rotatably mounted therein. Suitable driving means including a motor 16, a gear box 18, and various belts and pulleys are provided for rotating the driveshaft 14.

An elongated, longitudinally slit, collapsible tubular mandrel shell 20, having an elongated, longitudinally slit, collapsible tubular sleeve 22 removably mounted thereon in accordance with the invention, is rotatably mounted adjacent one end on the stationary sleeve 12. Intermediately of its opposite ends the shell 20 is secured to an end portion of the driveshaft 14 for rotation thereby.

An inner core or framework 24 for the mandrel shell 20 is shown, by way of example, as including a plurality of I-beams 26 welded to suitable rings such as an end ring 28. A mounting collar 30 secured to the end ring 28 is rotatably supported on rolls 32 suitably mounted around the periphery of the sleeve 12. A spring 34 is secured to the radially inner sides of the I-beams 26 along with respective pairs of angle iron members 36 on opposite sides of the ring 34. A disk 38 secured to the ring 34 is also secured to a collar 40 on the driveshaft 14.

The mandrel shell 20 is rigidly secured to the core 24 for about a quarter of its periphery by a plurality of suitably braced arcuate plates 42 spaced axially of the shell, and flexibly secured to the core 24 by two rows of relatively long pivotally connected turnbuckles 44 and one row of relatively short pivotally connected turnbuckles 46. Axially spaced rings 48 braced by suitable bars 50 reinforce the mandrel shell 20, the turnbuckles 44 and 46 being pivotally connected to the rings 48. The arcuate plates 42 are counterbalanced by I-beam members 52.

Figure 3:
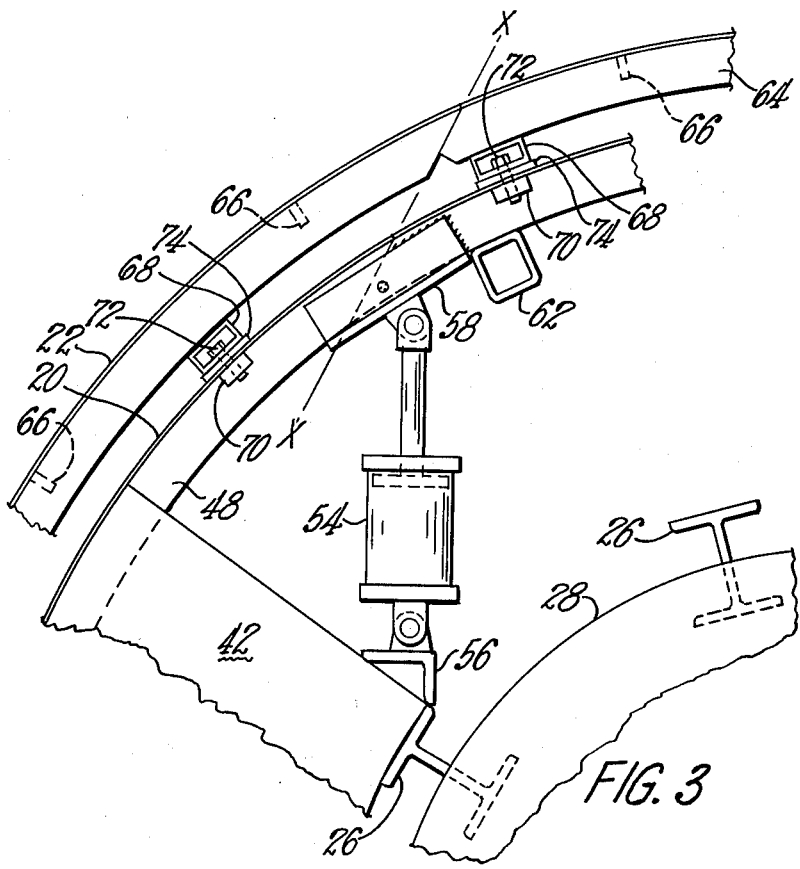
FIG. 3 is an enlarged fragmentary view of an upper left-hand portion of FIG. 1, with certain portions removed.

The mandrel 20 and rings 48 are slit along the line x—x (FIGS. 1 and 3). A plurality of pneumatic actuators 54 have cylinder portions pivotally connected to an angle iron member 56 secured to radially inner edge portions of the arcuate plates 42, and piston portions pivotally connected respectively to channel-shaped bracket members 58 straddling rings 48, respectively. For each bracket member 58, on the left-hand side of the slit line x—x as viewed in FIG. 3, the bracket 58 is not secured to the corresponding portion of the respective ring 48, but on the right-hand side of the slit line x—x, the opposite leg portions of the bracket 58 are welded respectively to opposite sides of the ring 48. Thus, when the pistons of the actuators 54 are retracted, the shell 20 will collapse by radially inward flexing of the flexible portion thereof not held rigid by arcuate plates 42. The rings 18 are tied together in their flexible portions by a plurality of arcuately spaced I-beams 60 (FIG. 1) and by a box beam 62 adjacent the slit line x—x.

As understood in the art, tank bodies or pipe can be formed by deposition of liquid thermosetting resin and glass fibers on the shell 20 while it is rotating. In accordance with our invention, when larger tank bodies or pipe sections are desired, the sleeve 22 is installed on the shell 20 as the mold surface for the resin and glass fibers.

Figure 4:
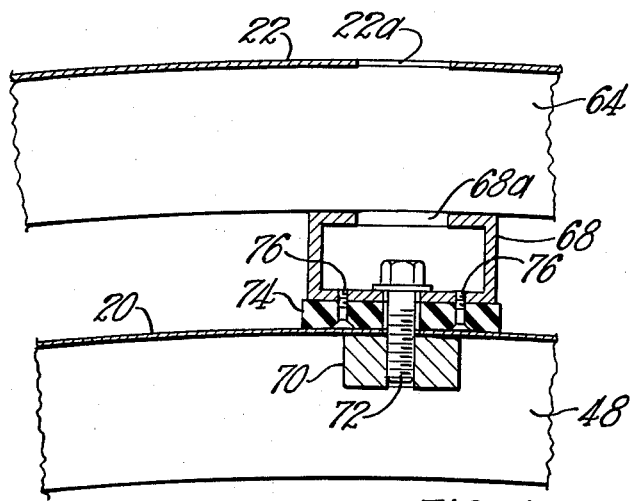
FIG. 4 is an enlarged fragmentary transverse sectional view showing the mounting means for the sleeve.

The sleeve 22 is reinforced by axially spaced rings 64 braced by suitable bars 66. The rings 64 and the sleeve 22 are also slit along the line x—x. Three rectangular tubes 68 extending the length of the sleeve 22 are welded to the inner periphery of the rings 64, two tubes 68 being adjacent the slit line x—x but on opposite sides thereof, and the third tube 68 being substantially diametrically opposite the slit (FIG. 1). In alignment with the tubes 68, anchoring bars 70 are welded between rings 48 on the inner side of the shell 20. At intervals between the rings 48 and 64, the sleeve 22 is provided with access holes such as hole 22a shown in FIG. 4, and the radially outer walls of the tubes 68 are provided with access holes 68a aligned respectively with the holes 22a. Screws 72 extending through the radially inner walls of the tubes 68 are threaded respectively into the anchoring bars 70 to secure the sleeve 22 in position. At the location of each screw 72, plastic pads 74 are secured to the tubes 68 by screws 76.

When the shell 20 is to be used as the mold surface for tank bodies or pipe, the holes at the screws 72 may be covered with tape, and when the sleeve 22 is installed for use as the mold surface, the holes 22a may be covered with tape. The actuators 54 will collapse the shell 20 when used without the sleeve 22, and will collapse both the shell 20 and the sleeve 22 when the sleeve 22 is installed.

We claim:

1. For use with a mandrel having an elongated longitudinally slit collapsible tubular shell rotatable about a horizontal axis and providing a molding surface for pipe of one diameter, the mandrel being supported from only one end and having an opposite end unobstructed at all times for ready removal of pipe axially of the mandrel, an elongated longitudinally slit tubular sleeve removably mountable on the mandrel shell concentrically therewith to provide a molding surface for pipe of a larger diameter than said one diameter, the sleeve being collapsible simultaneously with the mandrel shell when mounted thereon.

2. A sleeve as claimed in claim 1 including three mounting means thereon extending axially thereof and disposed respectfully at three places around the inner periphery thereof, namely adjacent the slit respectively on opposite sides thereof and substantially diametrically opposite the slit.

3. A sleeve as claimed in claim 2 wherein each of the mounting means comprises a rectangular tube having access holes in an outer wall providing access to screws extending through an inner wall for mounting the sleeve on the mandrel shell, and wherein the sleeve also has access holes providing access to the screws.

* * * * *